(12) United States Patent
Ohashi

(10) Patent No.: US 11,397,254 B2
(45) Date of Patent: Jul. 26, 2022

(54) ULTRASONIC DEVICE AND ULTRASONIC SENSOR

(71) Applicant: SEIKO EPSON CORPORATION, Tokyo (JP)

(72) Inventor: Koji Ohashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 215 days.

(21) Appl. No.: 16/535,445

(22) Filed: Aug. 8, 2019

(65) Prior Publication Data
US 2020/0049806 A1 Feb. 13, 2020

(30) Foreign Application Priority Data
Aug. 9, 2018 (JP) .............................. JP2018-150136

(51) Int. Cl.
*G01S 7/521* (2006.01)

(52) U.S. Cl.
CPC .................... *G01S 7/521* (2013.01)

(58) Field of Classification Search
CPC ........ G01S 7/521; G01S 15/42; B06B 1/0629
See application file for complete search history.

(56) References Cited

U.S. PATENT DOCUMENTS

| | | | | |
|---|---|---|---|---|
| 4,050,056 A | * | 9/1977 | Massa | G10K 11/18 367/191 |
| 5,060,651 A | * | 10/1991 | Kondo | A61B 8/4494 600/443 |
| 2007/0079661 A1 | | 4/2007 | Yoshida et al. | |
| 2011/0152691 A1 | * | 6/2011 | Ikeda | G10K 11/002 600/459 |
| 2013/0038174 A1 | * | 2/2013 | Kim | H01L 41/1132 310/327 |
| 2013/0049537 A1 | * | 2/2013 | Kim | H01L 41/1132 310/327 |
| 2013/0338502 A1 | * | 12/2013 | Onishi | H01L 41/25 600/443 |
| 2015/0187347 A1 | * | 7/2015 | Kojima | H01L 41/332 310/322 |
| 2017/0028440 A1 | | 2/2017 | Kiyose | |
| 2018/0033946 A1 | * | 2/2018 | Kemppinen | H01L 41/053 |
| 2018/0164432 A1 | * | 6/2018 | Lal | G06N 3/0635 |
| 2020/0061670 A1 | * | 2/2020 | Chan | G10K 11/002 |

FOREIGN PATENT DOCUMENTS

| | | | |
|---|---|---|---|
| JP | 2007-107954 A | 4/2007 | |
| JP | 2015-126449 A | 7/2015 | |
| JP | 2016-139871 A | 8/2016 | |
| JP | 2017-034360 A | 2/2017 | |
| WO | WO-2013047544 A1 * | 4/2013 | ........... B06B 1/0655 |
| WO | WO-2019234854 A1 * | 12/2019 | ............. H04R 17/00 |

\* cited by examiner

*Primary Examiner* — Isam A Alsomiri
*Assistant Examiner* — Vikas Atmakuri
(74) *Attorney, Agent, or Firm* — Oliff PLC

(57) ABSTRACT

An ultrasonic device includes a substrate having a first surface and a second surface having a front and back relationship with the first surface, and provided with an opening penetrating the second surface from the first surface; a vibration film provided over the first surface of the substrate so as to close the opening; a vibration element provided at a position overlapping the opening in the vibration film; and a sound absorbing portion provided over the second surface of the substrate.

4 Claims, 13 Drawing Sheets

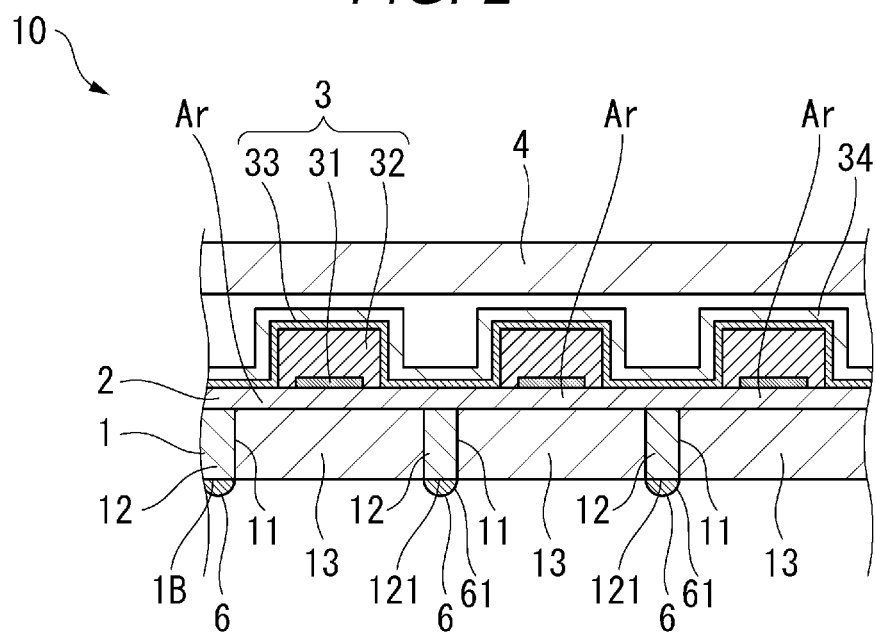
FIG. 2
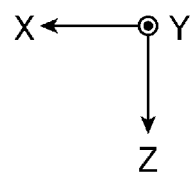

FIG. 3
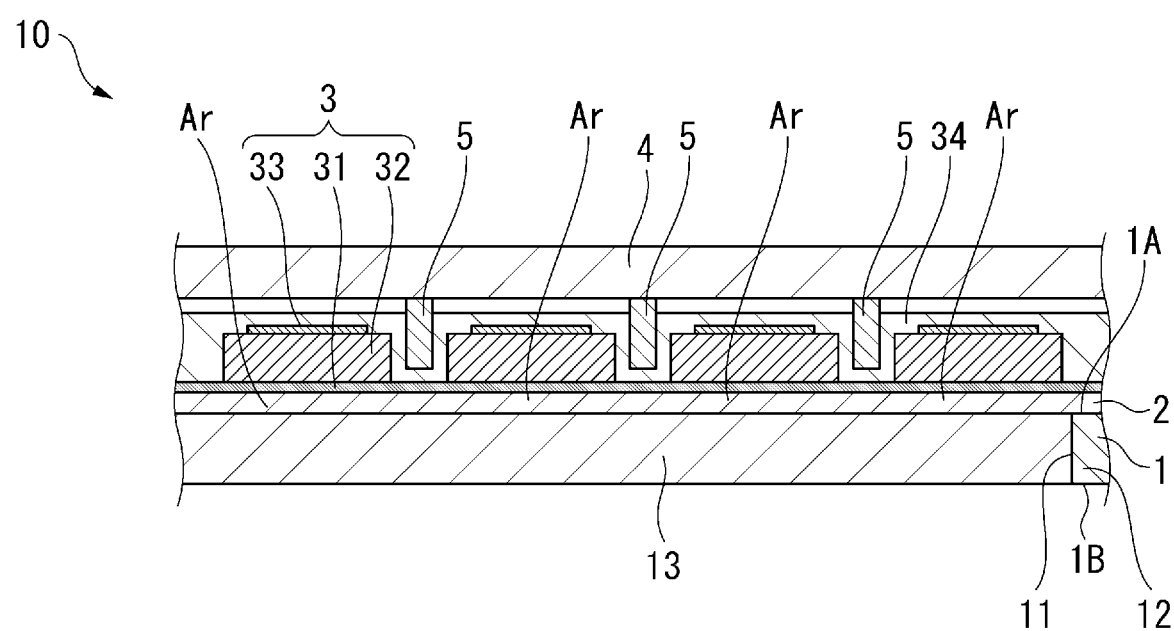
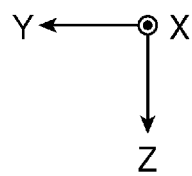

FIG. 5
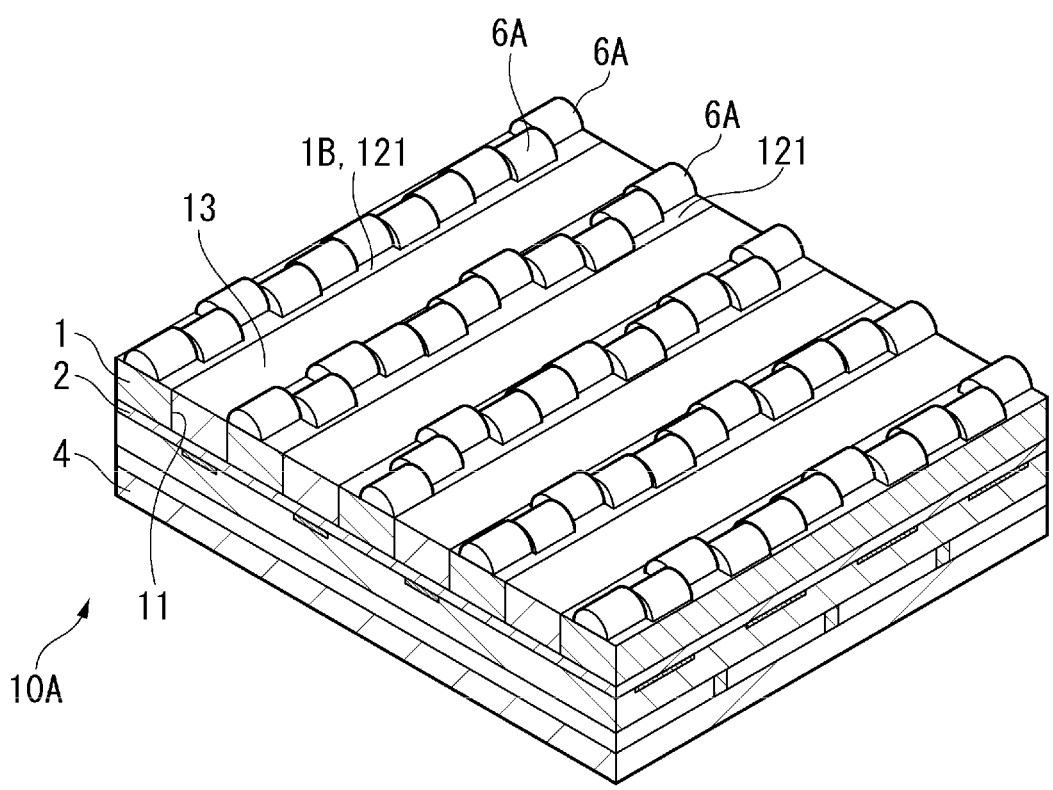
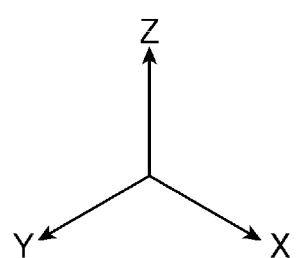

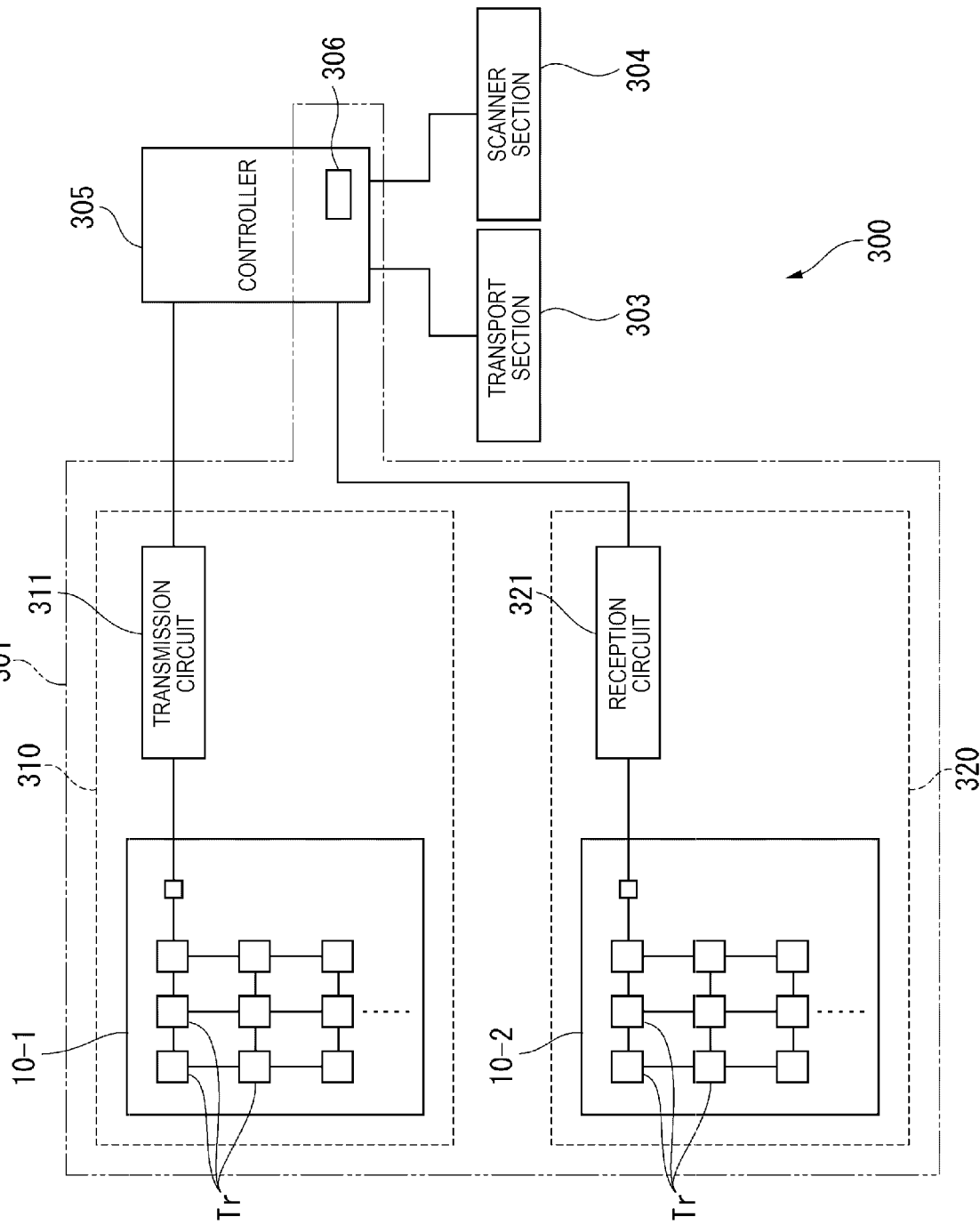

ULTRASONIC DEVICE AND ULTRASONIC SENSOR

The present application is based on, and claims priority from JP Application Serial Number 2018-150136, filed Aug. 9, 2018, the disclosure of which is hereby incorporated by reference herein in its entirety.

BACKGROUND

1. Technical Field

The present disclosure relates to an ultrasonic device and an ultrasonic sensor.

2. Related Art

In the related art, there is an ultrasonic device including a substrate provided with an opening, a vibration film provided to close one side of the opening, and an piezoelectric element disposed at a position overlapping the opening on the vibration film (refer to JP-A-2015-126449). In such an ultrasonic device, the vibration film is vibrated by driving the piezoelectric element to transmit an ultrasonic wave, or the vibration of the vibration film, when the ultrasonic wave input into the vibration film, is detected by the piezoelectric element.

In the ultrasonic device disclosed in JP-A-2015-126449, the ultrasonic wave generated by the vibration of the vibration film is transmitted from the opening of the substrate.

However, in an ultrasonic sensor using such an ultrasonic device, a phenomenon that the transmitted ultrasonic wave is reflected by a target object or the like, is reflected by an end surface of a wall portion surrounding the opening, and then is directed again to the target object, that is, multiple reflection of the ultrasonic wave occurs. This causes noise in the ultrasonic sensor.

SUMMARY

An ultrasonic device according to an aspect of the present disclosure includes: a substrate having a first surface and a second surface having a front and back relationship with the first surface, and provided with an opening penetrating the second surface from the first surface; a vibration film provided over the first surface of the substrate so as to close the opening; a vibration element provided at a position overlapping the opening in the vibration film; and a sound absorbing portion provided over the second surface of the substrate.

In the ultrasonic device according to the aspect of the present disclosure, the substrate may be provided with a plurality of the openings and may have a wall portion supporting the vibration film that surrounds the openings, and the sound absorbing portion may be provided over an end surface of the wall portion on a side opposite to the vibration film side.

In the ultrasonic device according to the aspect of the present disclosure, the sound absorbing portion may have a curved surface having a shape that projects from the substrate.

An ultrasonic sensor according to an aspect of the present disclosure includes: the ultrasonic device; and a controller controlling the ultrasonic device.

BRIEF DESCRIPTION OF THE DRAWINGS

FIG. 2 is a sectional view of the ultrasonic device corresponding to line II-II of FIG. 1.

FIG. 3 is a sectional view of the ultrasonic device corresponding to line III-III of FIG. 1.

FIG. 5 is a perspective view illustrating a part cut out from an ultrasonic device according to Modification Example of the first embodiment.

FIG. 13 is a block diagram illustrating a schematic configuration of the image scanner according to the third embodiment.

DESCRIPTION OF EXEMPLARY EMBODIMENTS

First Embodiment

Figure 1:
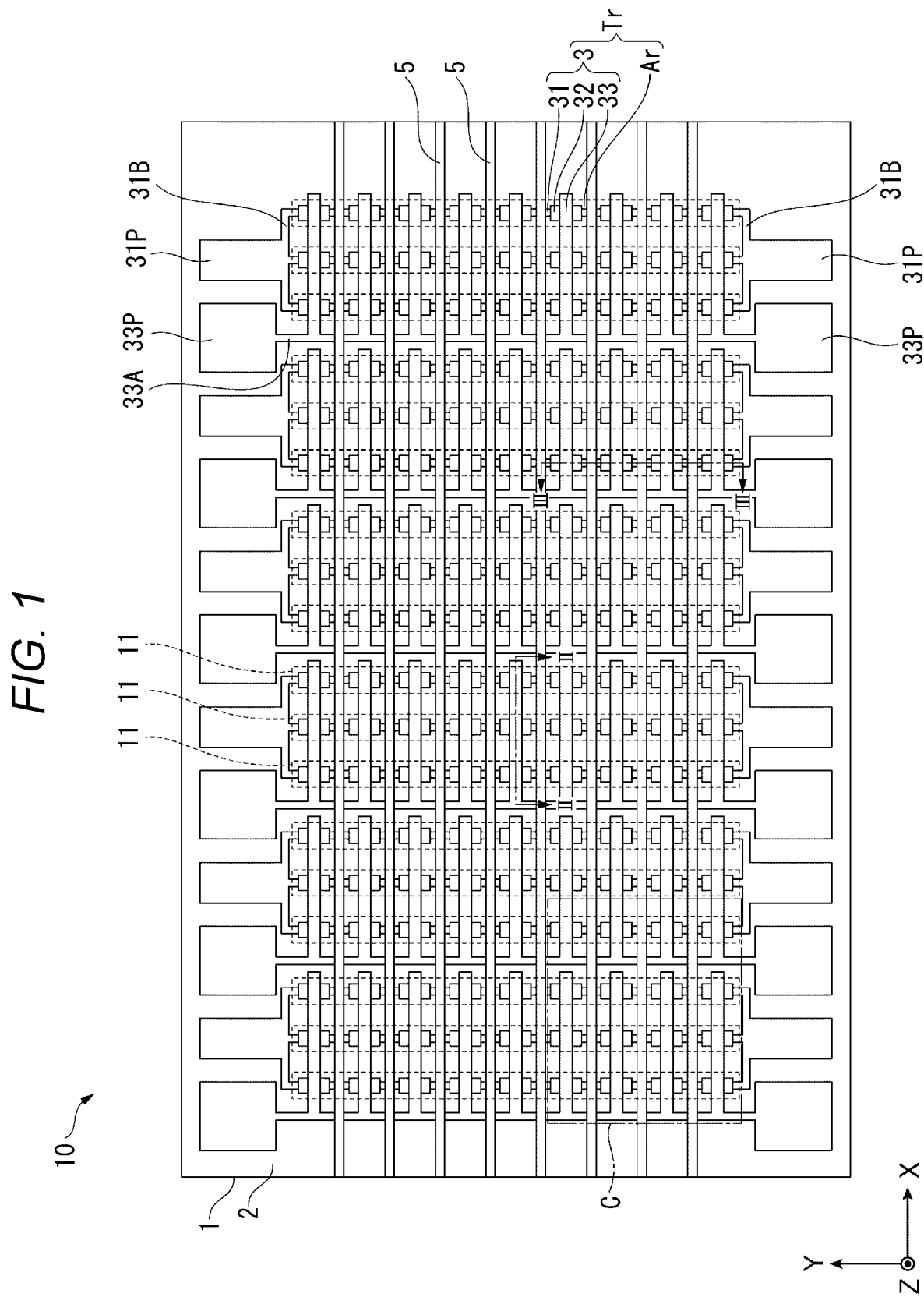
FIG. 1 is a plan view illustrating a schematic configuration of an ultrasonic device according to a first embodiment.

An ultrasonic device 10 according to an embodiment of the present disclosure will be described with reference to FIGS. 1 to 3. The ultrasonic device 10 of the embodiment includes a substrate 1, a vibration film 2, piezoelectric elements 3 (vibration elements), a sealing plate 4, partition wall portions 5, and sound absorbing portions 6.

FIG. 1 is a plan view of the ultrasonic device 10 in a state where the sealing plate 4 or the like is omitted as viewed from a piezoelectric element 3 side, FIG. 2 is a sectional view of the ultrasonic device 10 corresponding to line II-II of FIG. 1, and FIG. 3 is a sectional view of the ultrasonic device 10 corresponding to line III-III of FIG. 1. In the following description, a substrate thickness direction of the substrate 1 is taken as a Z direction and biaxial directions orthogonal to the Z direction are taken as an X direction and a Y direction.

Configuration of Substrate

The substrate 1 is a semiconductor substrate of silicon or the like, and has a first surface 1A and a second surface 1B in a front and back relationship. Here, a surface on one side (−Z side) of the substrate 1 is referred to as the first surface 1A and a surface on the other side (+Z side) of the substrate 1 is referred to as the second surface 1B.

A plurality of openings 11 penetrating the second surface 1B of the substrate 1 from the first surface 1A to are provided in a center region of the substrate 1 in an XY plane. The plurality of the openings 11 are disposed in the X direction, a length dimension of the opening 11 in the Y direction is set larger than a length dimension of the opening 11 in the X direction.

In the substrate 1, a portion surrounding the opening 11 is referred to as a wall portion 12. The wall portion 12 divides the openings 11 adjacent in the X direction.

An inside the opening 11 of the substrate 1, that is, a space surrounded by the wall portion 12 and the vibration film 2 is filled with a damping layer 13 of silicone resin or the like. The damping layer 13 has a function of shortening a time until the vibration of the vibration film 2 described later converges, and suppressing vibration propagation (cross talk) between vibration regions Ar described later.

Configuration of Vibration Film

The vibration film 2 is a laminated body of a silicon oxide film and zirconium oxide. The vibration film 2 is provided over the first surface 1A of the substrate 1 so as to close the opening 11 of the substrate 1, and is supported by the wall portion 12 of the substrate 1. A thickness dimension of the vibration film 2 has a sufficiently smaller thickness dimension than that of the substrate 1.

Here, in the vibration film 2, each region overlapping the opening 11 and surrounded by the wall portion 12 and the partition wall portion 5 described later is referred to as the vibration region Ar.

Configuration of Piezoelectric Element

The piezoelectric element 3 is constituted of a lower electrode 31, a piezoelectric layer 32, and an upper electrode 33 on the vibration film 2. In other words, a portion where the lower electrode 31, the piezoelectric layer 32, and the upper electrode 33 overlap in the film thickness direction (Z direction) functions as the piezoelectric element 3.

On the vibration film 2, the lower electrode 31 is linearly patterned having a predetermined width in the X direction and extending in the Y direction, and is continuously provided over a plurality of the vibration regions Ar adjacent to each other in the Y direction. A plurality of the lower electrodes 31 (three in the embodiment) adjacent in the X direction are connected by a connection wiring 31B at both end portions in the Y direction. The connection wiring 31B is drawn out to a peripheral portion of the substrate 1 and a lower electrode terminal 31P is provided at an end portion thereof.

The upper electrode 33 is linearly patterned having a predetermined width in the Y direction and extending in the X direction, and is continuously provided over the plurality (three in the embodiment) of the vibration regions Ar adjacent in the X direction.

One end portion of the upper electrode 33 is connected to a common electrode line 33A. The common electrode line 33A connects a plurality of the upper electrodes 33 arranged in the Y direction. The common electrode line 33A is drawn out to the peripheral portion of the substrate 1 and upper electrode terminals 33P are provided at both end portions thereof.

The piezoelectric layer 32 is formed of a thin film of a piezoelectric substance such as lead zirconate titanate (PZT). The piezoelectric layers 32 are arranged in a matrix shape corresponding to intersecting positions of the lower electrode 31 and the upper electrode 33 in plan view as viewed from the Z direction. Here, the piezoelectric layer 32 is disposed at a position corresponding to the vibration region Ar of the vibration film 2.

A protective layer 34 made of alumina or the like is laminated on each upper surface of the vibration film 2 and the piezoelectric element 3.

Configuration of Sealing Plate and Partition Wall Portion

The sealing plate 4 is disposed to face the vibration film 2 and the partition wall portion 5 is joined to both the vibration film 2 and the sealing plate 4. With such a configuration, a space around the piezoelectric element 3 is sealed by the sealing plate 4 and the partition wall portion 5. However, the sealing plate 4 may be provided with a through-hole (not illustrated) for inserting a wiring portion (FPC or the like) connected to the lower electrode terminal 31P or the upper electrode terminal 33P.

The partition wall portion 5 is configured to include a plurality of lines extending in the X direction so as to be disposed between the piezoelectric elements 3 arranged in the Y direction.

That is, in the vibration film 2 of the embodiment, the wall portion 12 is in contact with the vibration regions Ar adjacent in the X direction, and the partition wall portion 5 is in contact with the vibration regions Ar adjacent in the Y direction. Therefore, direct transmission of the vibration of the vibration film 2 is suppressed between the vibration regions Ar adjacent in the X direction or the Y direction.

Transmission and Reception of Ultrasonic Wave

In the ultrasonic device 10 of the embodiment, a plurality of ultrasonic transducers Tr is constituted by the plurality of the vibration regions Ar of the vibration film 2 and the piezoelectric elements 3 provided in each of the vibration regions Ar. That is, in the ultrasonic device 10 of the embodiment, the plurality of the ultrasonic transducers Tr are arranged in a matrix shape in the X direction and the Y direction.

In the ultrasonic transducer Tr having such a configuration, the piezoelectric layer 32 between the lower electrode 31 and the upper electrode 33 is contracted by applying a pulse wave voltage of a predetermined frequency between the lower electrode 31 and the upper electrode 33. Therefore, the vibration region Ar, in which the piezoelectric element 3 is provided, vibrates and the ultrasonic wave is transmitted from the +Z side of the vibration region Ar via the opening 11. Here, the wall portion 12 surrounding the opening 11 has a function of improving directivity of the transmitted ultrasonic wave.

The ultrasonic wave propagated toward the ultrasonic device 10 vibrates the vibration region Ar of the vibration film 2, so that a potential difference is generated above and below the piezoelectric layer 32 in the vibration region Ar. Therefore, it is possible to detect (receive) the ultrasonic wave by detecting the potential difference generated between the lower electrode 31 and the upper electrode 33.

Configuration of Sound Absorbing Portion

Figure 4:
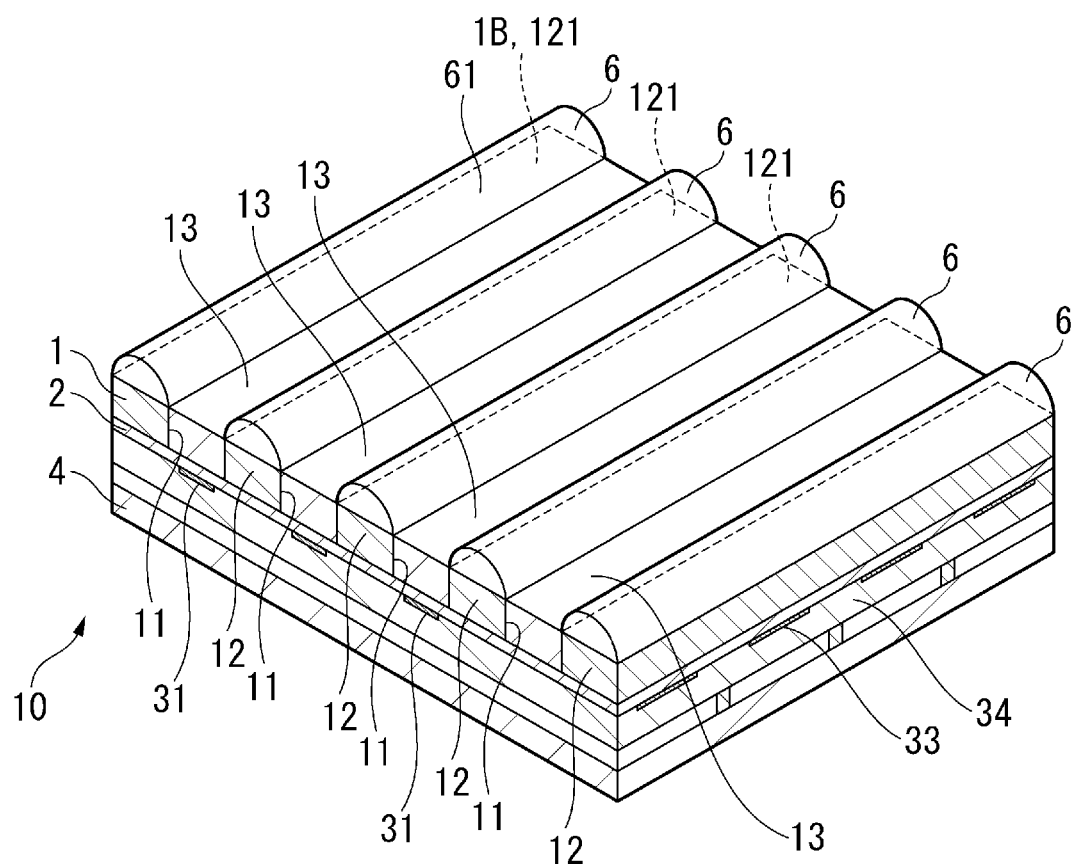
FIG. 4 is a perspective view illustrating a part cut out from the ultrasonic device according to the first embodiment.

FIG. 4 is a perspective view of a part of the ultrasonic device 10 corresponding to C portion of FIG. 1, as cut out and viewed from the +Z side.

As illustrated in FIGS. 2 and 4, the sound absorbing portions 6 are provided over the second surface 1B of the substrate 1. Specifically, the sound absorbing portions 6 are arranged in a plurality of lines extending in the Y direction so as to be sandwiched between the openings 11 in the X direction on the second surface 1B (end surface 121 of the wall portion 12 on the +Z side) of the substrate 1. In the embodiment, the sound absorbing portions 6 are arranged in all regions sandwiched between the openings 11 in the X direction on the second surface 1B of the substrate 1.

The sound absorbing portion 6 is made of a rubber material or a resin material, and is preferably a foam. The sound absorbing portions 6 have a plurality of semi-cylindrical shapes extending in the Y direction, and have arc-shaped curved surfaces 61 projecting from the substrate 1 to the +Z side. The curved surfaces 61 are parallel in the Y direction and are curved in the X direction.

The sound absorbing portion 6 having such a configuration absorbs the ultrasonic wave, among the ultrasonic waves propagating toward the ultrasonic device 10, collided with the sound absorbing portion 6.

Effects of First Embodiment

As described above, the ultrasonic device 10 of the embodiment has the first surface 1A and the second surface 1B having the front and back relationship with the first surface 1A, and includes the substrate 1 provided with the opening 11 penetrating the second surface 1B from the first surface 1A, the vibration film 2 provided over the first surface 1A of the substrate 1 so as to close the opening 11, the piezoelectric element 3 provided at the position overlapping the opening 11 in the vibration film 2, and the sound absorbing portion 6 provided over the second surface 1B of the substrate 1.

In the ultrasonic device 10 having such a configuration, it is possible to absorb the ultrasonic wave, among the ultrasonic waves reflected by a target object, incident on a portion other than the opening 11, and suppress the multiple reflection of the ultrasonic wave between the substrate 1 and the target object by the sound absorbing portion 6.

In the ultrasonic device 10 of the embodiment, the substrate 1 is provided with the plurality of openings 11 and has the wall portion 12 supporting the vibration film 2 and surrounding the opening 11, and the sound absorbing portion 6 is provided over the end surface 121 of the wall portion 12 on a side opposite to a vibration film 2 side.

In such a configuration, if the target object having a reflection surface inclined with respect to the vibration film 2 of the ultrasonic device 10 exists, the sound absorbing portion 6 can absorb the ultrasonic wave, among the ultrasonic waves reflected by the reflection surface, directed to the opening 11 which is not immediately above the target object. Therefore, it is possible to suppress the reception of the ultrasonic wave reflected by the target object that is not immediately below the opening 11.

In the ultrasonic device 10 of the embodiment, the sound absorbing portion 6 has the curved surface 61 having a shape projecting from the substrate 1. According to such a configuration, it is possible to more efficiently absorb the ultrasonic wave propagating toward the sound absorbing portion 6.

As described above, in the ultrasonic sensor using the ultrasonic device 10 of the embodiment, it is possible to detect the target object with high accuracy. An ultrasonic sensor using the ultrasonic device 10 of the embodiment will be described in detail in a second embodiment.

Modification Example of Sound Absorbing Portion

The disposition and the shape of the sound absorbing portion according to the present disclosure are not limited to the description in the first embodiment.

In the first embodiment, the sound absorbing portions 6 are linearly arranged along the opening 11 on the second surface 1B of the substrate 1, but are not limited to the embodiment. In an ultrasonic device 10A illustrated in FIG. 5, sound absorbing portions 6A may be randomly arranged on a second surface 1B of a substrate 1. The sound absorbing portions 6A may be disposed in a part of regions without being disposed in all the regions sandwiched between the openings 11 in the X direction on the second surface 1B of the substrate 1.

In the first embodiment, the sound absorbing portion 6 has the curved surface 61 projecting to the +Z side, but is not limited thereto, and may have only a plane, or may have irregular uneven surface.

Second Embodiment

Next, a second embodiment will be described. In the second embodiment, an ultrasonic sensor 201 including the ultrasonic device 10 described in the first embodiment will be described. In the second embodiment, a picking system 200 using the ultrasonic sensor 201 will be briefly described.

Figure 6:
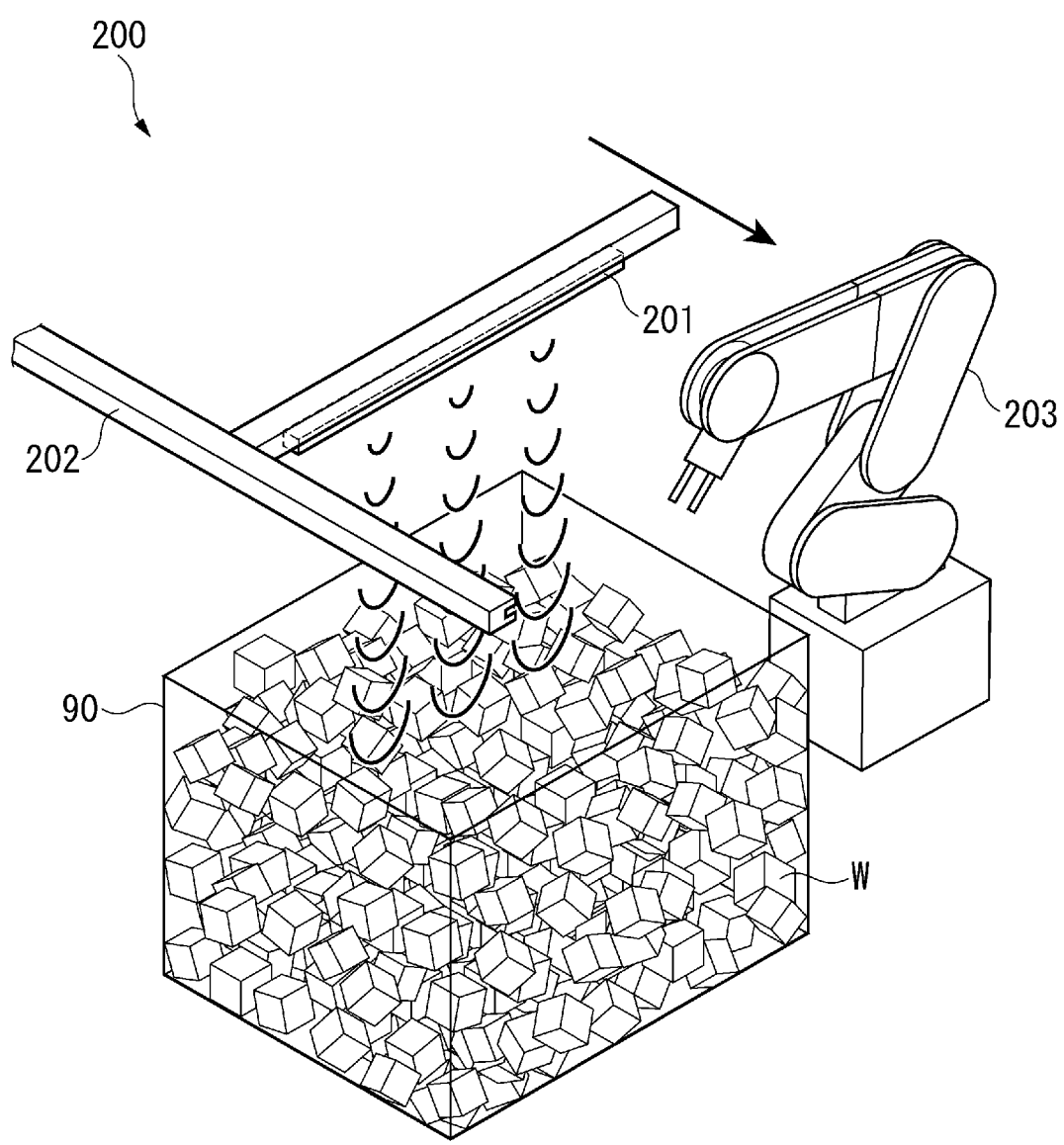
FIG. 6 is a schematic view illustrating a schematic configuration of a picking system according to a second embodiment.
Figure 7:
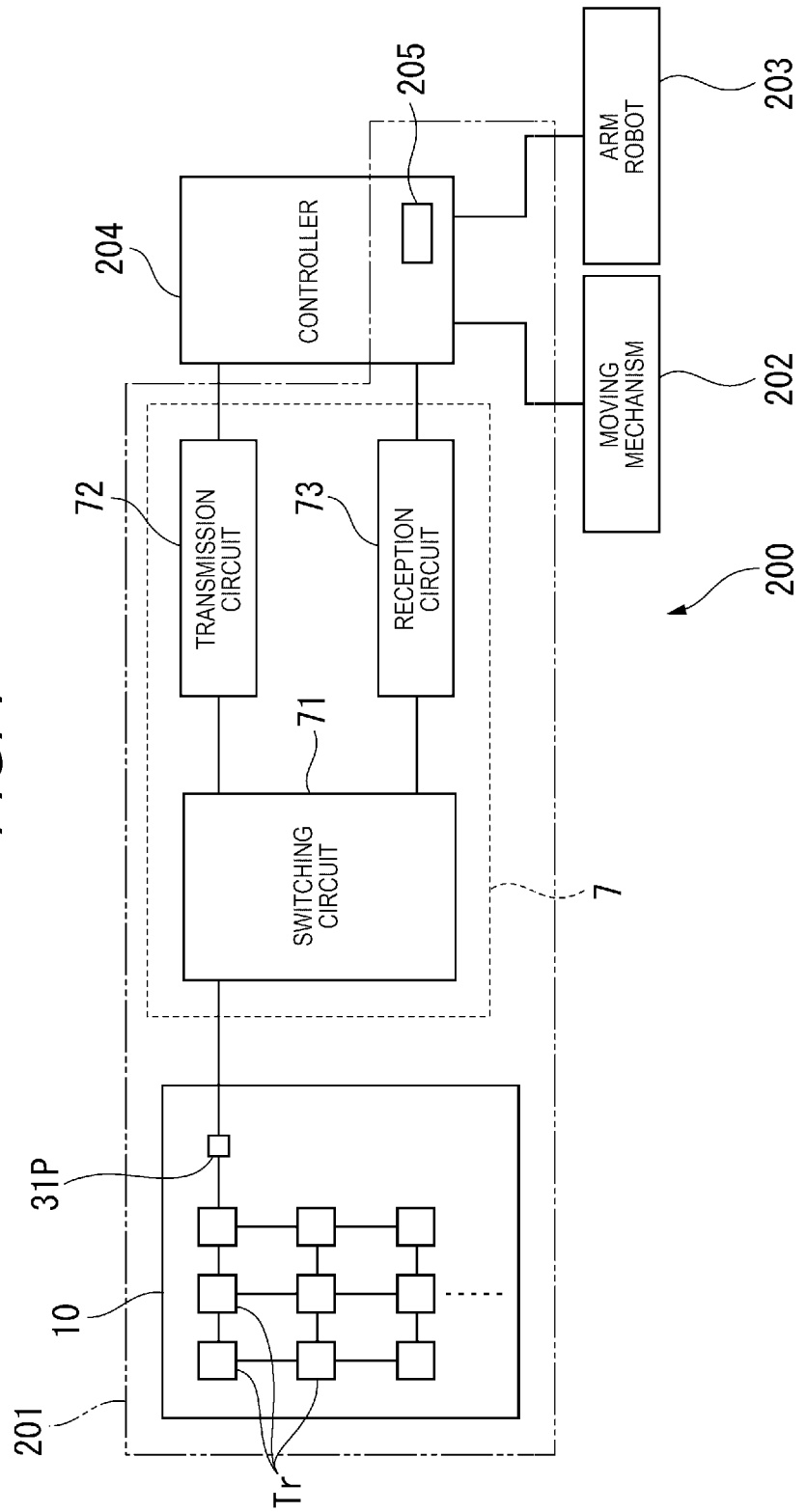
FIG. 7 is a block diagram illustrating a schematic configuration of the picking system according to the second embodiment.

As illustrated in FIGS. 6 and 7, the picking system 200 of the embodiment is configured to include the ultrasonic sensor 201 transmitting and receiving the ultrasonic wave, a moving mechanism 202 moving the ultrasonic sensor 201, an arm robot 203 picking a workpiece W, and a controller 204. The picking system 200 of the embodiment specifies a workpiece W in a posture suitable for picking from a plurality of workpieces W irregularly accommodated in a case 90 of which an upper side is open, and picks up the workpiece W.

The ultrasonic sensor 201 is configured to include the ultrasonic device 10 described in the first embodiment, and in the ultrasonic sensor 201, an XY plane in the ultrasonic device 10 is disposed substantially horizontally.

As illustrated in FIG. 7, the ultrasonic sensor 201 includes a driving circuit 7 for driving the ultrasonic device 10, and the driving circuit 7 includes a switching circuit 71, a transmission circuit 72, and a reception circuit 73.

The switching circuit 71 is connected to each lower electrode terminal 31P, the transmission circuit 72, and the reception circuit 73. The switching circuit 71 is constituted by a switching circuit, and switches a transmission connection connecting each of the lower electrode terminals 31P and the transmission circuit 72, and a reception connection connecting each of the lower electrode terminals 31P and the reception circuit 73.

The transmission circuit 72 is connected to the switching circuit 71 and the controller 204, and when the switching circuit 71 is switched to the transmission connection, outputs a driving signal based on the control of the controller 204, and transmits the ultrasonic wave from the ultrasonic device 10.

The reception circuit 73 is connected to the switching circuit 71 and the controller 204, and when the switching circuit 71 is switched to the reception connection, a reception signal is input from each of the lower electrode terminals 31P. The reception circuit 73 is configured to include a linear noise amplifier, an A/D converter, or the like, and outputs the reception signal after processing to the controller 204 after performing each signal process such as conversion of an input reception signal into a digital signal, removal of noise components, or amplification to a desired signal level.

The moving mechanism 202 is configured so as to move the ultrasonic sensor 201 along any one horizontal direction. The ultrasonic sensor 201 scans the plurality of the workpieces W in the case 90 by the moving mechanism 202 which is driven and controlled by the controller 204.

The arm robot 203 is an arm robot configured to suck and hold the workpiece W, and is driven and controlled by the controller 204 to pick and transport the workpiece W in the case 90.

The controller 204 is configured to include an ultrasonic wave controller 205 by a Central Processing Unit (CPU) or the like. The ultrasonic wave controller 205 corresponds to a controller according to the present disclosure, controls the ultrasonic device 10 via the driving circuit 7, and causes the ultrasonic device 10 to perform the transmission and reception process of the ultrasonic wave. The ultrasonic wave controller 205 acquires position information of the workpiece W based on a reception signal input from the ultrasonic device 10.

The controller 204 drives and controls the moving mechanism 202, the arm robot 203, or the like, or specifies the workpiece W of a posture suitable for picking based on the position information of the workpiece W detected by the ultrasonic sensor 201.

In addition, the controller 204 may include a storage section that stores various data and various programs for controlling each configuration.

Effects of Second Embodiment

Effects of the ultrasonic sensor 201 in the second embodiment will be described with reference to Comparative Example. An ultrasonic sensor according to Comparative Example is configured to include an ultrasonic device 10B which is not provided with the sound absorbing portion 6 of the embodiment, and the same reference numerals are given to the same configurations of the embodiment.

Figure 8:
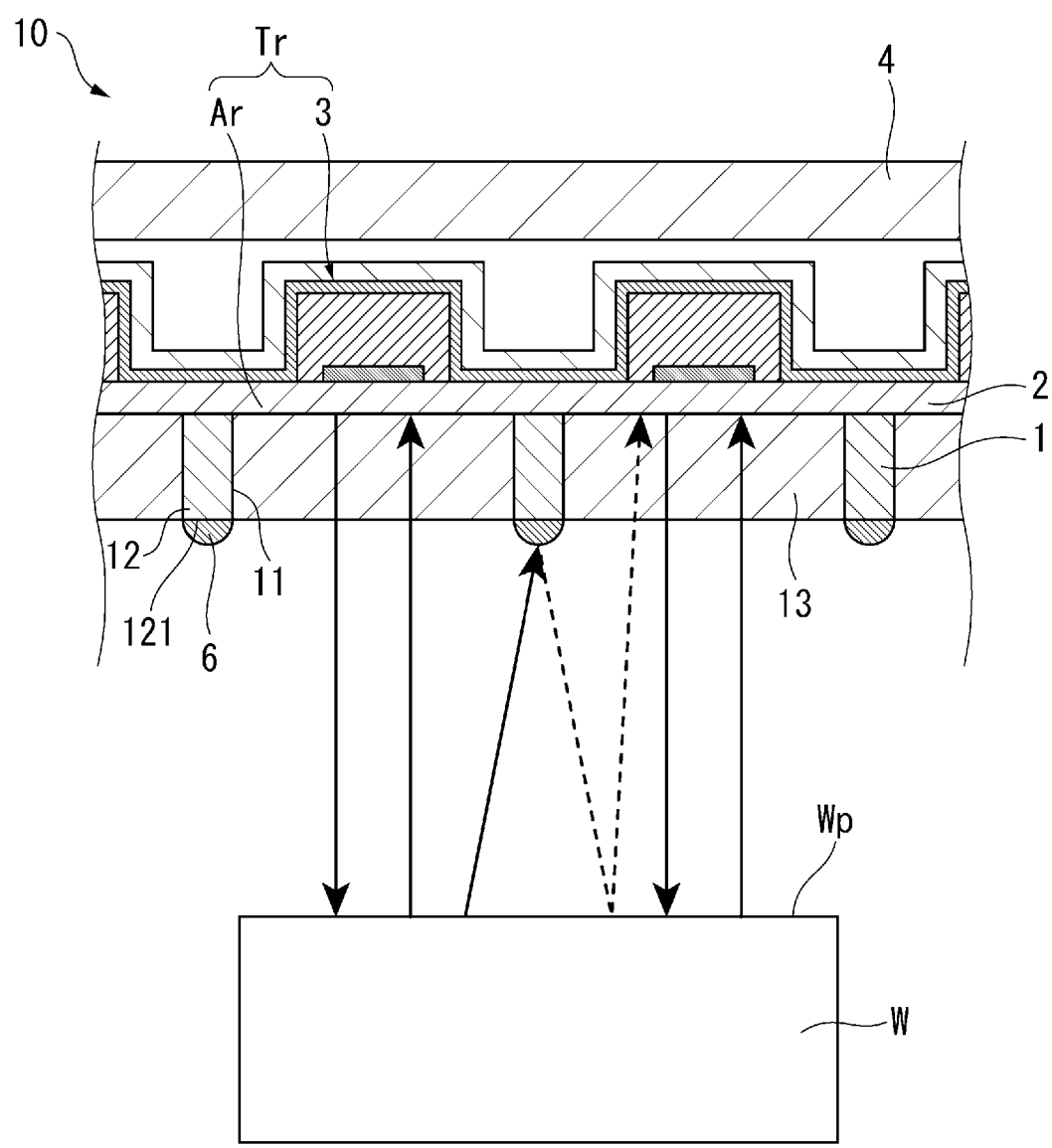
FIG. 8 is a view for explaining a workpiece in a suitable posture and how an ultrasonic wave is propagated in the second embodiment.

In the ultrasonic sensor 201 of the embodiment, as illustrated in FIG. 8, if a workpiece upper surface Wp is substantially parallel to the vibration film 2 (workpiece W is in a suitable posture), an ultrasonic wave, among the ultrasonic waves transmitted from the vibration region Ar immediately above the workpiece W, specularly reflected by the workpiece W is received in the vibration region Ar of a transmission source. Therefore, the ultrasonic sensor 201 can detect the position information of the workpiece W existing immediately below the vibration region Ar receiving the ultrasonic wave.

Here, when there is a component toward the wall portion 12 among the ultrasonic waves reflected by the workpiece W, the ultrasonic wave component is absorbed by the sound absorbing portion 6 provided over the end surface 121 of the wall portion 12. That is, in the ultrasonic device 10 of the embodiment, the multiple reflection of the ultrasonic wave is suppressed between the end surface 121 of the wall portion 12 and the workpiece W. Therefore, a delay phenomenon of the reception signal in the ultrasonic sensor 201 is suppressed.

Figure 9:
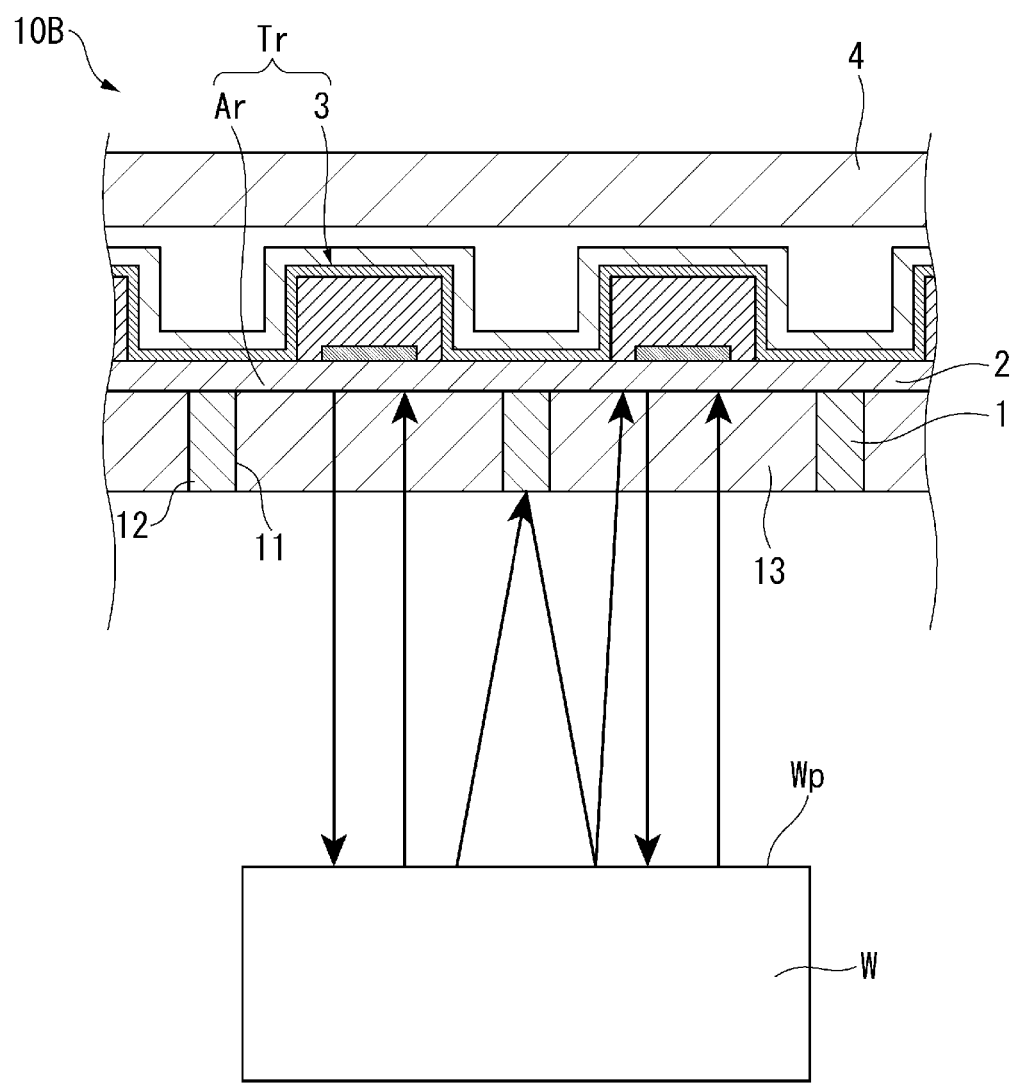
FIG. 9 is a view for explaining a workpiece in a suitable posture and how an ultrasonic wave is propagated in Comparative Example.

On the other hand, in the ultrasonic sensor of Comparative Example, as illustrated in FIG. 9, since the sound absorbing portion 6 of the embodiment does not exist, the ultrasonic wave component reflected by the end surface 121 of the wall portion 12 exists. That is, in Comparative Example, the ultrasonic wave repeatedly reflected between the end surface 121 of the wall portion 12 and the workpiece W is received via the opening 11. Therefore, in the ultrasonic sensor of Comparative Example, the delay phenomenon of the reception signal occurs due to the multiple reflection of the ultrasonic wave.

Particularly, in the picking system. 200 illustrated in FIG. 6, the ultrasonic sensor 201 scans the workpiece W. Therefore, in the picking system 200 using the ultrasonic sensor of Comparative Example, there is a problem that an edge of the workpiece W cannot be accurately detected due to the delay phenomenon of the reception signal.

On the other hand, in the embodiment, as described above, since the delay phenomenon of the reception signal is suppressed in the ultrasonic sensor 201, the edge of the workpiece W can be accurately detected.

Figure 10:
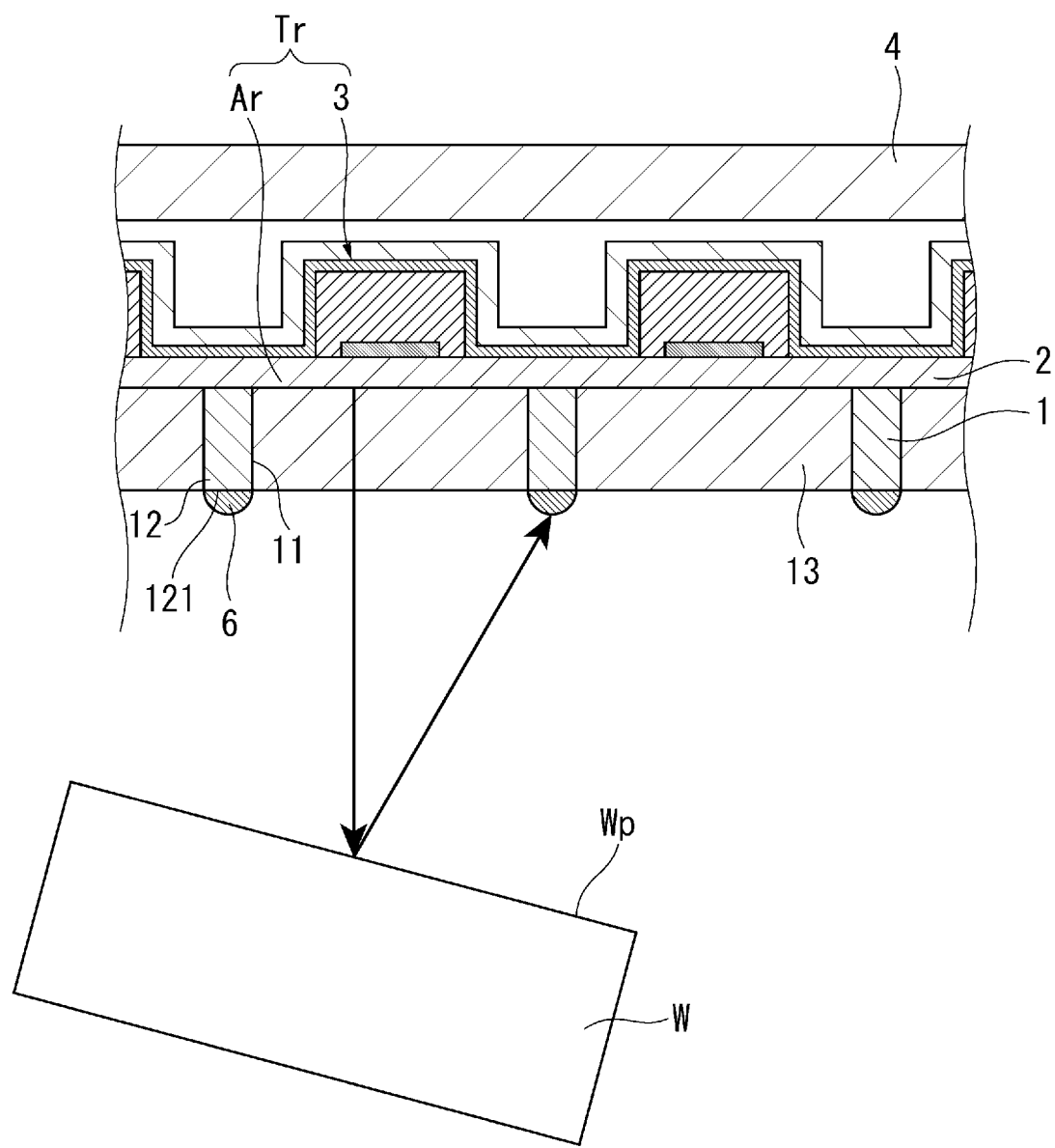
FIG. 10 a view for explaining the workpiece in an unsuitable posture and how the ultrasonic wave is propagated in the second embodiment.

In the ultrasonic sensor 201 of the embodiment, as illustrated in FIG. 10, if the workpiece upper surface Wp is inclined (workpiece W is in an unsuitable posture) with respect to the vibration film 2, the ultrasonic wave transmitted from the vibration region Ar immediately above the workpiece W is specularly reflected by the workpiece W and then is directed to the wall portion 12 surrounding the vibration region Ar without returning to the vibration region Ar of the transmission source.

Here, the ultrasonic wave directed to the wall portion 12 is absorbed by the sound absorbing portion 6 provided over the end surface 121 of the wall portion 12. Therefore, in the ultrasonic sensor 201 of the embodiment, it is possible to suppress detection of the workpiece W which is in an unsuitable posture.

Figure 11:
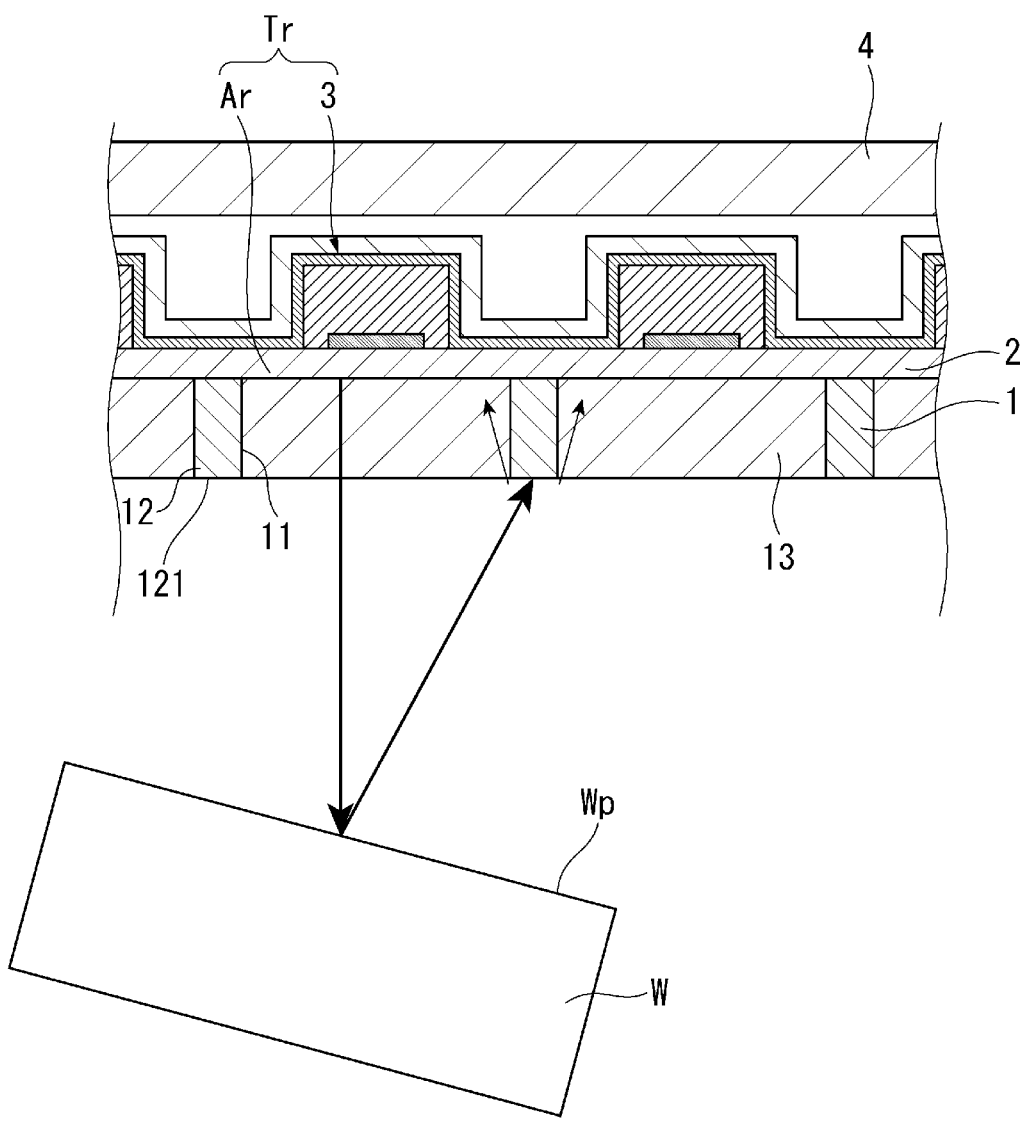
FIG. 11 is a view for explaining the workpiece in an unsuitable posture and how the ultrasonic wave is propagated in Comparative Example.

On the other hand, in the ultrasonic sensor of Comparative Example, as illustrated in FIG. 11, since the sound absorbing portion 6 of the embodiment does not exist, the ultrasonic wave directed toward the wall portion 12 wraps around the wall portion 12, and splits on both sides of the wall portion 12. Therefore, the ultrasonic wave may be received not only by the vibration region Ar that is the transmission source but also by a vibration region Ar adjacent to the vibration region Ar. That is, in the ultrasonic sensor of Comparative Example, the workpiece W may be detected at a position at which the workpiece W does not exist originally due to the ultrasonic wave reflected by the workpiece W of the unsuitable posture.

On the other hand, in the embodiment, as described above, since the configuration, in which the ultrasonic wave reflected by the workpiece W of the unsuitable posture is not received, is provided, it is possible to accurately detect the workpiece w in the suitable posture without detecting the workpiece W at a position at which the workpiece W does not exist originally.

As described above, according to the ultrasonic sensor 201 of the embodiment, it is possible to more accurately detect the position information of the workpiece W than the ultrasonic sensor of Comparative Example in which the sound absorbing portion 6 does not exist. Therefore, the picking system 200 using the ultrasonic sensor 201 of the embodiment can more accurately specify the workpiece W in the suitable posture, and can accurately pick the workpiece W.

Third Embodiment

Next, a third embodiment will be described. In the third embodiment, an ultrasonic sensor 301 having another form including a configuration similar to the ultrasonic device 10 of the first embodiment will be described. In the third embodiment, an image scanner 300 using the ultrasonic sensor 301 will be briefly described.

Figure 12:
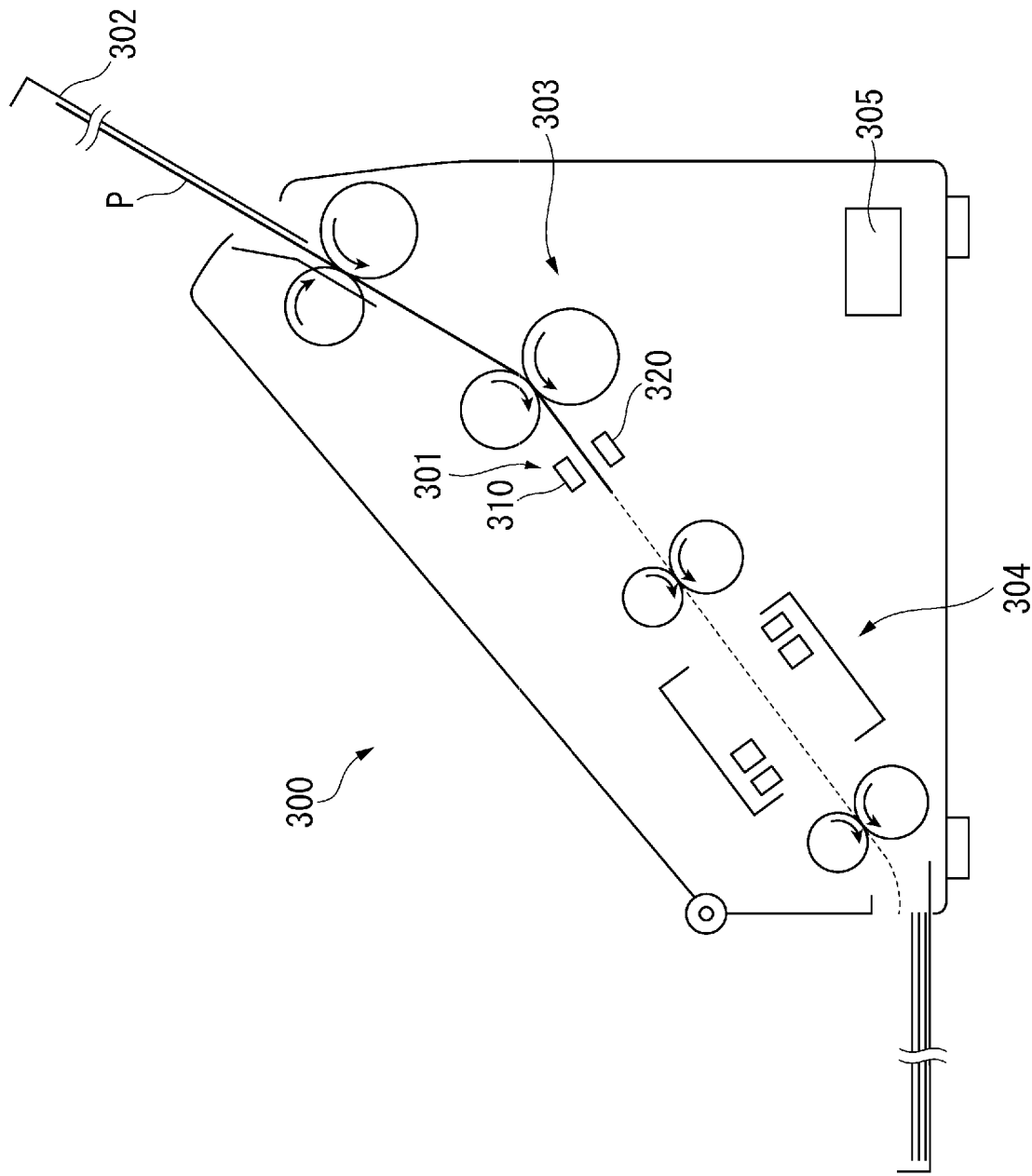
FIG. 12 is a schematic view illustrating a schematic configuration of an image scanner according to a third embodiment.

As illustrated in FIGS. 12 and 13, the image scanner 300 of the embodiment includes a sheet support 302 on which a sheet P is placed, a transport section 303 transmitting the sheet P, a scanner section 304 reading an image of the transported sheet P, the ultrasonic sensor 301 detecting multiple feeding (double feeding) of the sheet P, and a controller 305.

For each configuration other than the ultrasonic sensor 301 in the image scanner 300, since a well-known configuration can be used, detailed description will be omitted, and hereinafter, the ultrasonic sensor 301 will be mainly described.

The ultrasonic sensor 301 includes a transmitting section 310 and a receiving section 320.

The transmitting section 310 includes a transmitting-side ultrasonic wave device 10-1 having a configuration similar to that of the ultrasonic device 10 of the first embodiment, and a transmission circuit 311. The transmission circuit 311 outputs a driving signal based on the control of the controller 305, and transmits the ultrasonic wave from the transmitting-side ultrasonic wave device 10-1.

The receiving section 320 includes a receiving-side ultrasonic wave device 10-2 having a configuration similar to that of the ultrasonic device 10 of the first embodiment, and a reception circuit 321. The reception circuit 321 is configured to include a linear noise amplifier, an A/D converter, or the like, and outputs the reception signal to the controller 305 after processing after performing each signal process such as conversion into a digital signal, removal of a noise component, or amplification to a desired signal level for the reception signal input from the receiving-side ultrasonic wave device 10-2.

The controller 305 is configured to include an ultrasonic wave controller 306 by a Central Processing Unit (CPU) or the like. The ultrasonic wave controller 306 corresponds to a controller according to the present disclosure, controls the transmitting-side ultrasonic wave device 10-1 via the transmission circuit 311, and causes the transmitting-side ultrasonic wave device 10-1 to perform the transmission and reception process of the ultrasonic wave.

The ultrasonic wave controller 306 determines the multiple feeding of the sheet P based on the reception signal input from the receiving-side ultrasonic wave device 10-2. Specifically, if a voltage value of the reception signal is smaller than a predetermined threshold, it is determined that the sheet P is in the multiple feeding.

In addition, the controller 305 may include a storage section that stores various data and various programs for controlling each configuration such as the transport section 303 or the scanner section 304.

Effects of Third Embodiment

The ultrasonic sensor 301 of the third embodiment includes the transmitting-side ultrasonic wave device 10-1 and the receiving-side ultrasonic wave device 10-2, and these are respectively configured similar to the ultrasonic device 10 of the first embodiment. Therefore, in each of the transmitting-side ultrasonic wave device 10-1 and the receiving-side ultrasonic wave device 10-2, a phenomenon that the ultrasonic wave is repeatedly reflected between the substrate 1 and the sheet P, that is, the multiple reflection of the ultrasonic wave is suppressed. Therefore, an adverse effect due to the multiple reflection can be reduced and the multiple feeding of the sheet P can be accurately determined.

Modification Examples

The present disclosure is not limited to each embodiment described above, and modifications, improvements, and configurations which can be obtained by appropriately combining respective embodiments are included in the present disclosure within the range in which the object of the present disclosure can be achieved.

In the first embodiment, the ultrasonic transducers Tr are constituted of the vibration regions Ar of the vibration film 2 and the piezoelectric elements 3 are arranged in the matrix shape, but the ultrasonic transducers Tr are not limited to the embodiment. The ultrasonic transducers Tr may be arranged linearly or in a zigzag.

In the first embodiment, the ultrasonic device 10 is configured to include the plurality of the ultrasonic transducers Tr, but may be configured to include one ultrasonic transducer Tr. That is, the substrate according to the present disclosure may be provided with one opening.

In the first embodiment, the wall portion 12 exists on the +Z side of the vibration film 2 and the partition wall portion 5 exists on the −Z side of the vibration film 2, so that each vibration region Ar of the vibration film 2 is divided, but the configuration is not limited to the first embodiment. A lattice-shaped wall portion exists on the +Z side of the vibration film 2, so that each vibration region Ar of the vibration film 2 may be divided. In this case, a sound absorbing portion having the same lattice shape may be provided over an end surface on the +Z side of the lattice-shaped wall portion.

In the first embodiment, as the vibration element, the piezoelectric element 3 obtained by laminating the lower electrode 31, the piezoelectric layer 32, and the upper electrode 33 in the thickness direction of the vibration film 2 is exemplified, but the vibration element is not limited to the embodiment. A configuration, in which a pair of electrodes is disposed to face each other on one surface side of the piezoelectric layer orthogonal to the thickness direction, may be provided. Alternatively, the electrodes may be disposed so as to sandwich the piezoelectric film on a side surface of the piezoelectric layer in the thickness direction.

A first electrode provided over the vibration film 2 and a second electrode facing the first electrode via an air gap are provided without using the piezoelectric layer, and a vibration element, which vibrates the vibration film 2 by an electrostatic force or detects the vibration of the vibration film 2, may be used.

The picking system 200 of the second embodiment is configured to cause the ultrasonic sensor 201 to scan the workpiece W in one direction, but the configuration is not limited to the embodiment. The ultrasonic sensor 201 may scan the workpiece W being moved by a belt conveyor or the like in one direction.

In the third embodiment, the transmitting section 310 and the receiving section 320 respectively include the transmitting-side ultrasonic wave device 10-1 and the receiving-side ultrasonic wave device 10-2 having the configurations similar to that of the ultrasonic device 10 of the first embodiment, but the configurations are not limited to the embodiment. That is, one of the transmitting section 310 and the receiving section 320 may include a configuration similar to that of the ultrasonic device 10 of the first embodiment.

In the third embodiment, the image scanner 300 is described as an example, but the ultrasonic sensor 301 may be applied to another apparatus (printing apparatus or the like) performing multiple feeding determination.

What is claimed is:

1. An ultrasonic device comprising:
a substrate having a first surface and a second surface having a front and back relationship with the first surface, the substrate including an opening formed to penetrate from the first surface through the second surface;
a vibration film provided over the first surface of the substrate so as to close the opening;
a vibration element positioned to overlap the opening and the vibration film; and
a plurality of sound absorbing portions configured to directly receive and absorb ultrasonic waves, the plurality of sound absorbing portions respectively disposed on an end of each wall of a plurality of walls formed in the second surface of the substrate, such that the sound absorbing portions are located on an outermost surface of the ultrasonic device, each wall extending from the first surface to the second surface to form inner surfaces of the opening, and each sound absorbing portion having a semi-circular shape as viewed in a cross-section.

2. The ultrasonic device according to claim 1, wherein:

the substrate includes a plurality of the openings, which includes the opening formed in the substrate, and the substrate has a wall portion supporting the vibration film and surrounding the plurality of openings, and the plurality of sound absorbing portions are provided over an end surface of the wall portion on a side opposite to a vibration film side.

3. The ultrasonic device according to claim 1, wherein each sound absorbing portion has a curved surface that projects from the substrate.

4. An ultrasonic sensor comprising:

the ultrasonic device according to claim 1; and a controller controlling the ultrasonic device.

* * * * *